United States Patent [19]

James

[11] 4,272,972
[45] Jun. 16, 1981

[54] UNIVERSAL JOINT

[75] Inventor: Ian R. James, Lombard, Ill.

[73] Assignee: Lovejoy, Inc., Downers Grove, Ill.

[21] Appl. No.: 106,672

[22] Filed: Dec. 26, 1979

[51] Int. Cl.³ .............................................. F16D 3/26
[52] U.S. Cl. ................................... 64/17 SP; 403/58
[58] Field of Search ........................... 403/74, 58, 57; 64/17 SP, 17 R

[56] References Cited

U.S. PATENT DOCUMENTS

| | | | |
|---|---|---|---|
| 565,159 | 8/1896 | Esty | 64/17 R |
| 1,566,849 | 12/1925 | Fox | 64/17 R |
| 2,394,890 | 2/1946 | Blomgren | 64/17 R |
| 3,778,860 | 12/1973 | Thielen | 403/58 X |

FOREIGN PATENT DOCUMENTS 3873 5/1979 European Pat. Off. .

Primary Examiner—Andrew V. Kundrat
Attorney, Agent, or Firm—Kinzer, Plyer, Dorn & McEachran

[57] ABSTRACT

A universal joint formed of plastic parts and including two yokes and a block pivotally connected to the yokes. Each of the yokes has a cylindrical portion with a shaft receiving bore at one end thereof and a pair of arms integrally formed at the other end thereof. The outer surfaces of the arms are spaced apart a distance which is greater than the outer diameter of the cylindrical portion of the yoke. Aligned pin receiving bores are formed in the arms near the free ends thereof to receive pins to pivotally connect the block to the arms. A diametrically extending rib is positioned at the base of the arms of each yoke and is located to clear the block and permit pivotal movement thereof. Transversely extending strengthening ribs are formed on the exterior surfaces of the yoke arms. These ribs are positioned diametrically outwardly of the rib at the base of the arms and extend at right angles to the axis of that rib. The transversely extending ribs reduce in height in a direction from the free ends of the arms to the base of the arms.

3 Claims, 4 Drawing Figures

UNIVERSAL JOINT

SUMMARY OF THE INVENTION

This invention relates to universal joints of the type known as a Hooke's joint and specifically to such a universal joint that may be formed of molded plastic parts.

A purpose of this invention is a universal joint formed of plastic parts which is sufficiently strong and compact to be usable in small, lightweight machinery such as household snowblowers, etc.

Another purpose is a universal joint having plastic yoke arms which are reinforced against breakage.

Another purpose is a universal joint which may be easily assembled yet resists undesired separation.

Another purpose is a universal joint which does not require lubrication.

Other purposes may appear from time to time during the course of the specification and claims.

BRIEF DESCRIPTION OF THE DRAWINGS

The invention is illustrated more or less diagrammatically in the following drawings wherein.

DESCRIPTION OF THE PREFERRED EMBODIMENT

Figure 1:
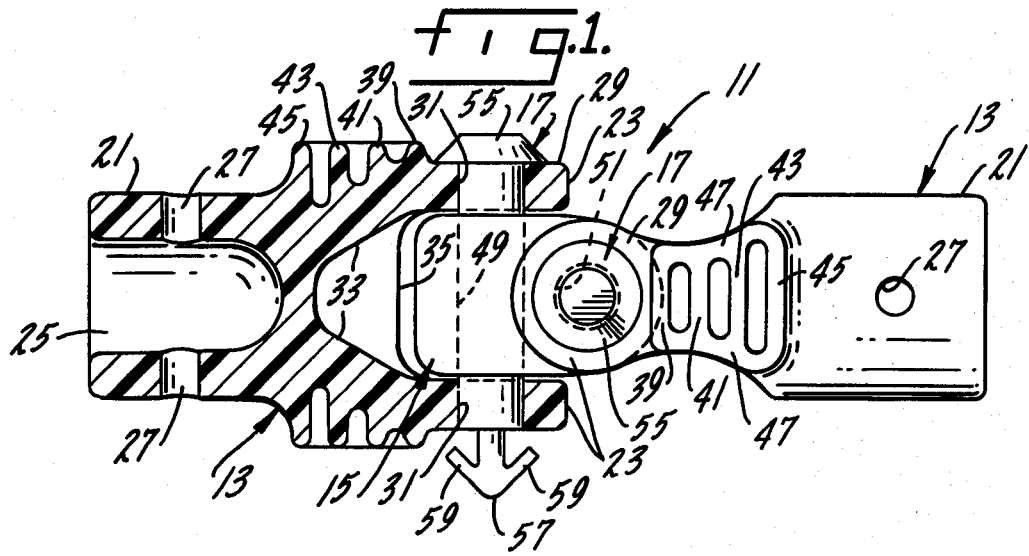
FIG. 1 is a top plan view on an enlarged scale of a universal joint of this invention with one part of the joint being shown in cross section.
Figures 2, 3:
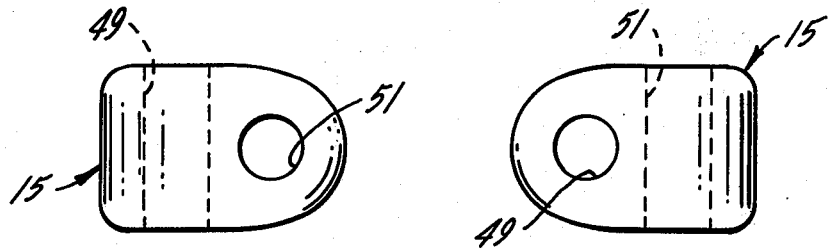
FIG. 2 is a top plan view of the block piece of the universal joint shown in FIG. 1.
FIG. 3 is a side elevational view of the block of FIG. 2.
Figure 4:
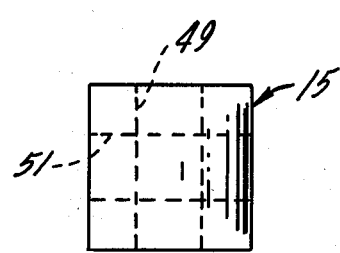
FIG. 4 is an end elevational view of the block of FIG. 2.

FIG. 1 of the drawings shows a top plan view, partially in cross section, of the universal joint 11 of this invention. The universal joint 11 is formed of plastic parts which may be molded from any suitably strong and resilient plastic. The universal joint consists of two yokes 13 and a block 15 which are connected by pins 17.

Each yoke 13 includes a cylindrical portion 21 and an integrally formed pair of arms 23 extending axially from one end of the cylindrical portion. An axial bore 25 is formed in the opposite end of the cylindrical portion and is adapted to receive a drive shaft, which is not shown. A locking pin passage 27 extends diametrically through the cylindrical portion and intersects the bore 25. Locking pins, not shown, are inserted in the passage 27 to fasten the drive shaft to each yoke.

The arms 23 have outer surfaces 29 located near the free ends thereof which surfaces are spaced apart a distance greater than the diameter of the cylindrical portion 21 of the yoke. Aligned locking pin passages 31 are formed in and extend through the outer surfaces 29 of these arms. The arms 23 taper towards each other at 33 where they merge with the cylindrical portion 21. A diametrically extending reinforcing rib 35 extends between the arms where they merge at 33 with the cylindrical portion 21 of the yoke.

A plurality of transversely extending ribs, in this example ribs 39, 41, 43 and 45 are formed on the outer surface of the arms axially inwardly of the pivot pin passages 31. These ribs are located radially outwardly of the reinforcing rib 35 and extend axially at right angles to this rib. These transversely extending ribs increase in height in the direction from the free end to the base of each arm. Curved side walls 47 connect and merge into the ribs.

The block 15 is of the offset pivot pin type having pivot pin passages 49 and 51 that are spaced from each other and extend at right angles to each other. The block 15 is dimensioned to fit between the arms 23 of each yoke and to clear the rib 35 at the base of each arm.

The pivot pin 17 is formed of plastic and has a head 55 which engages the outer surface 29 of an arm and an arrow shaped portion 57 at the opposite end thereof. The arrow shaped portion 57 has compressible and resilient barbs 59 which have an expanse greater than the diameter of the passages 31, 49 or 51 to prevent removal of the pivot pins from locking engagement with the yokes and block.

The universal joint of this invention is inexpensive to manufacture yet is sufficiently strong to be used in heavy duty machinery such as farm machinery and is sufficiently compact to be used in small machinery such as household snowblowers. Its low cost of manufacture results, in part, from being formed in its entirety from molded plastic parts. Its low cost is also due to its ease of assembly using pivot pins having arrow shaped tips which eliminate the cost of applying separate fasteners to the pivot pins during assembly. The strength of the joint is, in part, obtained through the use of wide spaced yoke arms which are reinforced against breakage both interiorly and exteriorly. The alignment of the reinforcing rib extending between the arms with the ribs formed on the exterior of the arms provides this strength. Additional strength is obtained from the use of a block having offset pivot pin passages.

I claim:

1. A universal joint formed of plastic and including two yokes and a block with the block received between and pivotally connected to the yokes,
    each of said yokes including a cylindrical portion having a shaft receiving bore at one end and a pair of arms integrally formed at the other end with the outer surfaces of the arms being spaced apart a distance which is greater than the outer diameter of the cylindrical portion,
    aligned pin receiving bores formed in the arms near the free ends thereof to receive pins pivotally connecting the block to the yokes,
    a diametrically extending rib connecting said arms and positioned at the base of said arms to prevent free pivotal movement of the block relative to the yokes, and
    transversely extending strengthening ribs formed on the exterior diametric surfaces of the yoke arms with the transversely extending ribs aligned with the diametrically extending rib at the base of the arms,
    said transversely extending strengthening ribs extending at right angles to the diametrically extending rib at the base of the arms.

2. The universal joint of claim 1 in which said transversely extending strengthening ribs increase in thickness in a direction from the free end of the arms to the base of the arms.

3. A universal joint including two yokes and a block, all of which are formed of a strong resilient plastic,
    each yoke having a drive shaft receiving cylindrical portion at one end and block receiving arms formed integrally at the opposite end thereof, the block receiving arms extending both outwardly and axially from the cylindrical portion of the yoke and having inclined portions which merge with the cylindrical portion of the yoke and axially extending portions at the free ends thereof, a reinforcing rib extending radially between the inclined portions of the arms, and a plurality of reinforcing ribs located on the exterior surfaces of the inclined portions of the arms with the exterior ribs extending at right angles to the radially extending reinforcing rib between the arms.

* * * * *